July 8, 1941.  C. BANCROFT  2,248,484
HEAT ENERGIZED APPARATUS
Filed April 11, 1940  2 Sheets-Sheet 1

INVENTOR
CHARLES BANCROFT
BY Kenyon & Kenyon
ATTORNEYS

July 8, 1941.   C. BANCROFT   2,248,484
HEAT ENERGIZED APPARATUS
Filed April 11, 1940   2 Sheets-Sheet 2
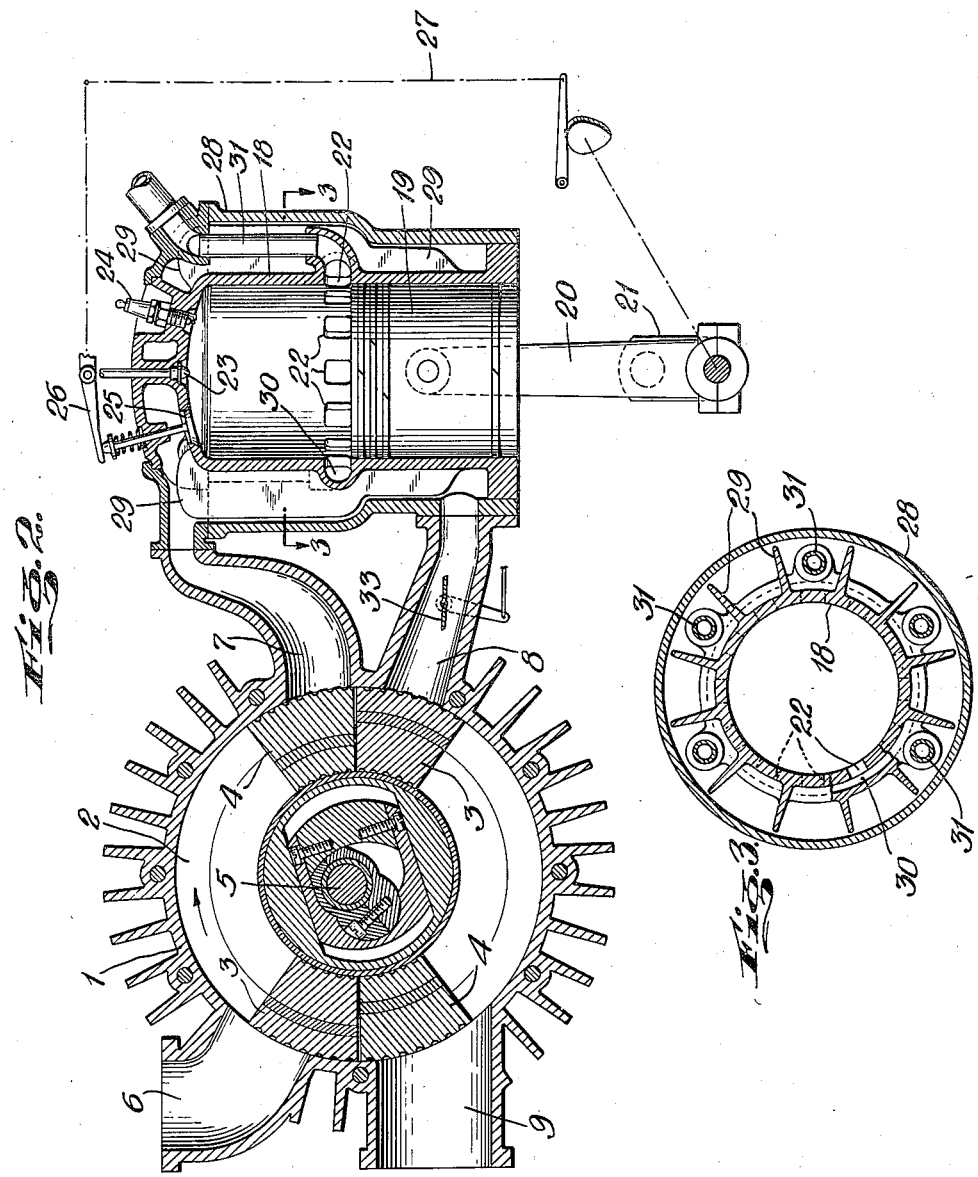
INVENTOR
CHARLES BANCROFT
BY Kenyon & Kenyon
ATTORNEYS.

Patented July 8, 1941

2,248,484

UNITED STATES PATENT OFFICE 2,248,484

HEAT ENERGIZED APPARATUS

Charles Bancroft, New Canaan, Conn.

Application April 11, 1940, Serial No. 329,009

18 Claims. (Cl. 60—14)

This invention relates to heat energized apparatus.

An object of this invention is the combination of a source of heat with a rotary displacement device of the alternately accelerating piston type operating to circulate air into heat exchange relation with said heat source and to utilize the heated air to develop power.

A further object of this invention is the provision of efficient and inexpensive means for supplying an internal combustion engine with air for scavenging and super-charging, for cylinder cooling and for re-claiming waste heat in the form of power.

According to this invention, a rotary displacement device of the alternately accelerating piston type has at least two pair of pistons operating in a ring cylinder which each pair of pistons alternately divides into two sections with the remaining pair of pistons dividing each section into two working chambers (spaces between successive pistons) for the compression and expansion of fluids and each section is provided with an inlet and an outlet. The inlet of one section is open to the atmosphere and the outlet of said section communicates with a passageway arranged in heat exchange relationship to a source of heat and communicating with the inlet to the remaining chamber. The outlet from said last-named chamber may be open to atmosphere or may communicate with the source of heat to supply combustion air thereto. In the first mentioned section, successive pistons co-operate to function as a pump to supply air under pressure to said passageway in which the air absorbs heat from the heat source and is thereby caused to expand. In the remaining section, the expanding air exerts pressure between successive pistons thereby developing power tending to rotate all the pistons. The heat source may be any unit in which heat is generated by the combustion of air and fuel. For example, the heat source may be an air or gas burner or may be the cylinder of an internal combustion engine.

In an embodiment of the invention having the cylinder of an internal combustion engine as the heat source, such cylinder is provided with a jacket, the opposite ends of which are connected respectively to the outlet of said first section and the inlet to the second section. If the engine is of the two-cycle type, some of the air may be supplied to the cylinder for scavenging as well as cooling the cylinder and also to provide the necessary air for combustion of the fuel charge.

Other objects, novel features and advantages of this invention will become apparent from the following specification and accompanying drawings, wherein:

Fig. 2 is a section through another embodiment of the invention as applied to a single cylinder two-cycle internal combustion engine;

Fig. 3 is a section on the line 3—3 of Fig. 2, and

Figure 1:
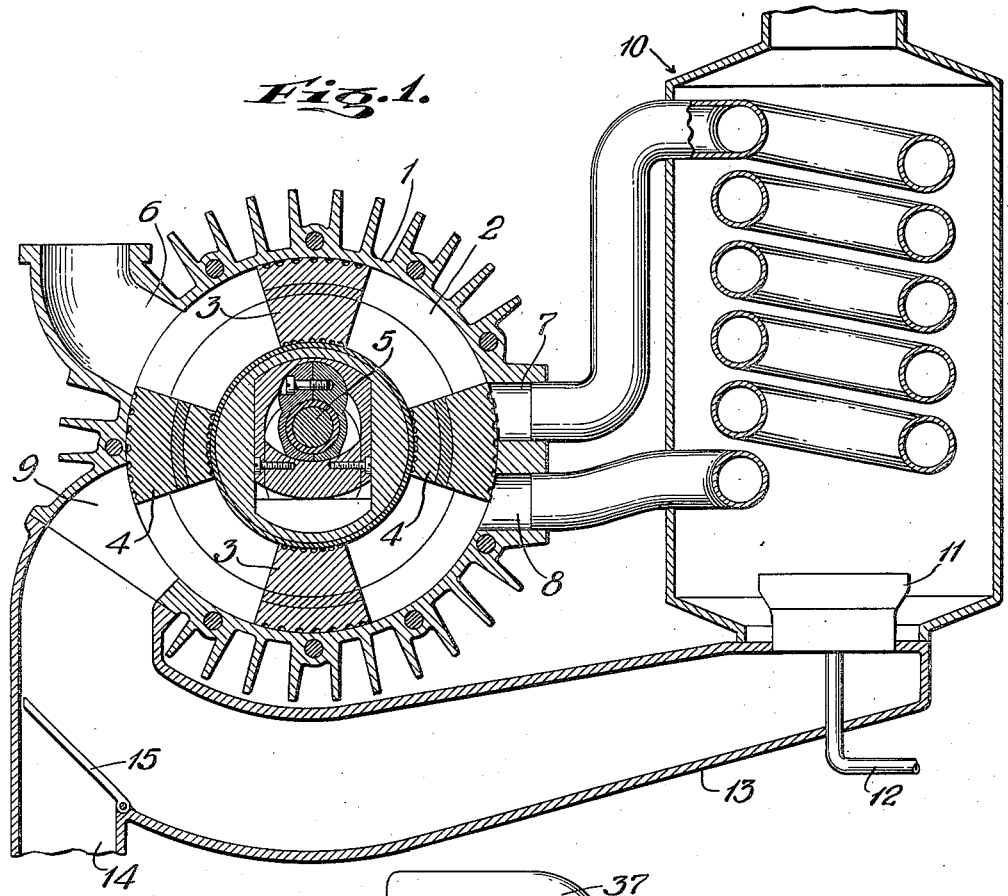
Fig. 1 illustrates one embodiment of the invention.

Referring now to Fig. 1, a rotary displacement unit 1 of the alternately accelerating piston type includes a ring cylinder 2 in which are arranged two pairs of pistons 3 and 4. A crank shaft 5 is connected to the pistons 3 and 4 to effect rotation of the pistons upon rotation of the crank shaft and to effect rotation of the crank shaft by operation of the pistons. Preferably, the mechanism interconnecting the pistons and crank shaft is the same as that disclosed in Bancroft Patent No. 2,132,596, whereby rotation of the crank shaft causes rotation of the pistons with alternate approach and recession of successive pistons. As shown in Fig. 1, one pair of pistons, in this instance the pistons 4, divides the ring cylinder 2 into two sections with the remaining pistons dividing each section into a pair of working chambers (spaces between successive pistons) the pistons 4 remaining substantially stationary while the pistons 3 move clockwise. The casing 2 is provided with two inlet ports 6 and 8 and two outlet ports 7 and 9, which, as shown in Fig. 2, are so arranged that the ports 6 and 9 communicate with the ring cylinder 2 on opposite sides of one position of minimum spacing of the pistons while the ports 7 and 8 are on opposite sides of the remaining position of minimum piston spacing.

A heat exchanger 10, such, for example, as a coil of pipe is connected between the outlet 7 and the inlet 8. A burner 11 is arranged in co-operating relationship to the heat exchanger 10 and a fuel pipe 12 leads to the burner 11. A conduit 13 leads from the outlet 9 to the burner 11 and is provided with a vent 14 controlled by a valve 15.

The arrangement of the ports 6, 7, 8 and 9 is such that the effective displacement of the pistons or the average pressure between the pistons or both in the section having the inlet 6 and the outlet 7 or pump unit is less than the effective displacement or average pressure or both in the section having the inlet 8 and outlet 9 or motor unit. The effective working stroke or displacement in the compressor unit may be varied by varying the width of the inlet port 6.

As shown in the drawings, the effective displacement in the pump unit equals the effective displacement in the motor unit, but due to the relative positioning of the ports 7 and 8, the average pressure against which the pistons in the compressor unit work is less than the average pressure acting on the pistons in the motor unit. This is because of the fact that the heater pressure is maintained between the pistons in the motor unit during practically the entire power stroke while the heater pressure is not obtained between the pistons in the compressor unit until the space between such pistons communicates with the port 7. Therefore, the average pressure between pistons in the compressor unit is substantially one-half the sum of atmospheric pressure and heater pressure which is less than the average pressure between pistons in the motor unit.

The port 8 is closed by a piston during the time that the space between it and the piston trailing it is in full communication with the heater 10 through the port 7 and is opened by movement of said piston just after the port 7 is closed by the trailing piston. The port 7 is kept closed by said last-named piston while the space between it and the leading piston is in full communication with the heater 10 through the port 8, and is opened by movement of the trailing piston as the leading piston reaches the maximum spacing between pistons.

With the arrangement just described, rotation of the crank shaft 5 causes operation of the pistons to draw air through the inlet port 6 and discharge such air under pressure through the outlet port 7 to the heat exchanger 10 which is heated by the combustion of air and fuel supplied to the burner 11. In the heat exchanger 10, the air absorbs heat and is thereby caused to expand. The expanding air flows inwardly through the inlet 8 and the pressure exerted thereby between successive pistons develops power which is supplied to the crank shaft 5 through the mechanism interconnecting the pistons and the crank shaft. Air discharged from the device 1 through the outlet port 9 is conducted by the conduit 13 to the burner 11 to supply the necessary air for effecting combustion of the fuel supplied through the pipe 12. The amount of air thus supplied to the burner 11 is controlled by the valve 15 which diverts air in excess of the amount required for combustion through the vent 14 to atmosphere. Suitable means (not shown) are provided for effecting initial rotation of the crank shaft 5 to start operation of the device 1.

In the embodiment illustrated in Fig. 2, the cylinder 18 of a two-cycle internal combustion engine is equipped with the usual piston 19, together with the connecting rod 20, by means of which power is transferred from the piston to the crank shaft 21. The cylinder also is provided with the usual exhaust ports 22, fuel injection valve 23, spark plug 24 and air inlet valve 25. The valve 25 is spring-biased to closed position and is opened by operation of a rocker arm driven from the crank shaft 21 through suitable means illustrated diagrammatically at 27. A jacket 28 surrounding the cylinder 18 communicates at its upper end with the outlet port 7 and at its lower end with the inlet port 8 of a rotary displacement device 1 of the same construction as above described. Fins 29 extend from the cylinder 18 to the inner periphery of the jacket 28 and a duct 30 connects the exhaust ports 22 with one or more conduits 31 extending through the space between the cylinder and the jacket. The crank shaft 21 is interconnected to the crank shaft 5 of the unit 1 for unitary rotation of the two shafts, through the medium of any suitable means (not shown).

The operation of the apparatus of Fig. 2 is substantially the same as that of Fig. 1. Air compressed between successive pistons is supplied to the jacket 28 and the air in such jacket absorbs heat from the cylinder. The expanding air flows through the port 8 between successive pistons on which it exerts pressure to develop power which is applied to the crank shaft 5. The expanded air is discharged through the port 9 into atmosphere.

The driving means 27 is so designed that the valve 25 is opened during a suitable period of time to effect flow of air into the cylinder 18 for cylinder scavenging and cooling purposes and also to supply air for combustion. A valve 33 is located in the passageway leading from the bottom of the jacket 28 to the inlet port 8 and during the initial period of operation such valve is closed to prevent the development of vacuum in the jacket 28 which condition would develop until after sufficient expansion of air in the jacket had been effected by heat absorbed from the cylinder unless prevented. Under normal operating conditions, however, the valve 33 is in open position.

Figure 4:
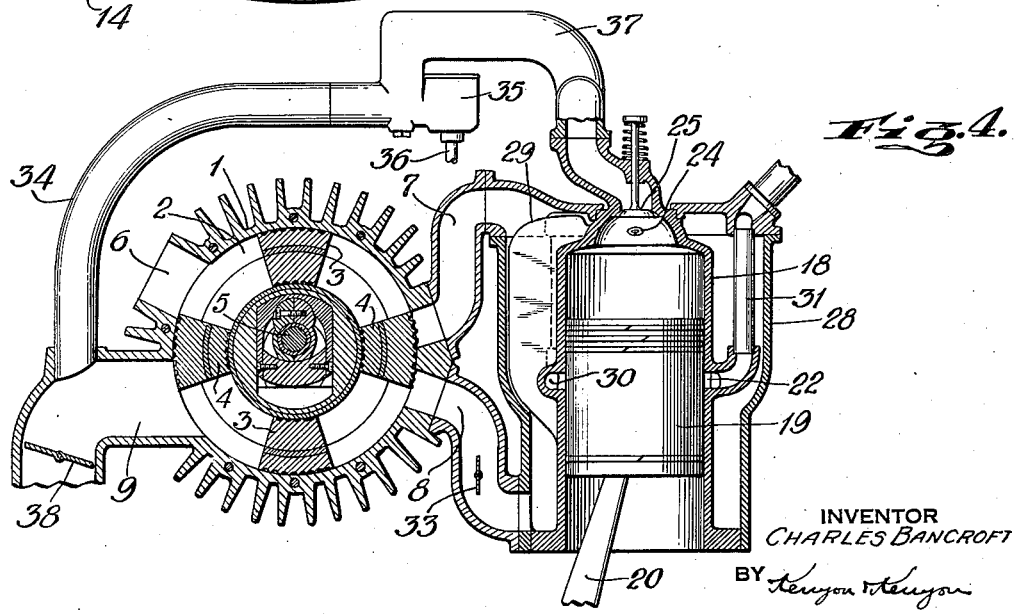
Fig. 4 is a view similar to Fig. 2 illustrating a modification thereof.

In Fig. 4 is disclosed a modification of the embodiment illustrated in Fig. 3. In this modification, the air inlet valve 25 is in communication with the outlet port 9 of the unit 1 rather than in communication with the outlet port 7. A conduit 34 leads from the outlet port 9 to the inlet of a carburetor 35 to which fuel is supplied through a pipe 36. The outlet of the carburetor 37 leads to the valve seat for the valve 25. A valve 38 in the outlet port 9 is provided to build up sufficient back pressure to cause flow of air through the conduit 34 to the carburetor 35 and from the carburetor into the cylinder 18.

The operation of the modification illustrated in Fig. 4 is the same as that of the embodiment illustrated in Fig. 2 except that a mixture of air and fuel is supplied to the piston through the valve 25 instead of air alone and the air supplied to the cylinder is discharged through the outlet 9 rather than through the outlet 7. In this modification, as well as in the embodiment of Fig. 2, air in the jacket 28 absorbs heat from the exhaust gases due to the passage of the conduit 31 through the jacket.

It is to be understood that the invention contemplates as well the combination of an engine having a fuel injector and a conduit leading from the outlet 9 directly to the valve 25 with omission of the carburetor 35. Also, it is to be understood that in the embodiment shown in Fig. 2, a carburetor may be interposed between the outlet port 7 and the valve 25 in which case the fuel injector 23 will be omitted.

Also, it is apparent that while the two-cycle engine has been specifically referred to above, other than two-cycle engines can be used as the heat source and that while the valve 33 usually is in open position during normal operating conditions, it may be properly adjusted to maintain any desired pressure in the jacket 28.

Although in the embodiment specifically disclosed herein the displacement device is equipped with two pairs of pistons, it is to be understood that the invention contemplates as well the use of rotary displacement devices of the alternately accelerating piston type equipped with more than two pairs of pistons.

I claim:

1. In combination, a rotary displacement device of the alternately accelerating piston type having at least two pairs of pistons and a ring cylinder which each pair of pistons alternately divides into a first and a second section with the remaining pair of pistons separating each section into two working chambers for the compression and expansion of fluids, an inlet and an outlet for each section with the inlet for one section being adjacent the outlet for the other section, said first section outlet and said second section inlet being closed and opened in succession by each piston, a source of heat, and a passageway for directing air from the first section outlet to the second section inlet in heat exchange relation to said heat source.

2. In combination, a rotary displacement device of the alternately accelerating piston type having at least two pairs of pistons and a ring cylinder which each pair of pistons alternately divides into a first and a second section with the remaining pair of pistons separating each section into two working chambers for the compression and expansion of fluids, an inlet and an outlet for each section with the inlet for one section being adjacent the outlet for the other section, said first section outlet and said second section inlet being closed and opened in succession by each piston, a combustion unit, a passageway for supplying fuel to said unit, means for directing air from the outlet of the first section to the second section inlet in heat exchange relation to said combustion unit, and means for supplying air from the second section outlet to said combustion unit.

3. In combination, a rotary displacement device of the alternately accelerating piston type having at least two pairs of pistons and a ring cylinder which each pair of pistons alternately divides into a first and a second section with the remaining pair of pistons separating each section into two working chambers for the compression and expansion of fluids, an inlet and an outlet for each section with the inlet for one section being adjacent the outlet for the other section, said first section outlet and said second section inlet being closed and opened in succession by each piston, an internal combustion engine cylinder, and a passageway for directing air from the first section outlet to the second section inlet in heat exchange relation to said engine cylinder.

4. In combination, a rotary displacement device of the alternately accelerating piston type having at least two pairs of pistons and a ring cylinder which each pair of pistons alternately divides into a first and a second section with the remaining pair of pistons separating each section into two working chambers for the compression and expansion of fluids, an inlet and an outlet for each section with the inlet for one section being adjacent the outlet for the other section, said first section outlet and said second section inlet being closed and opened in succession by each piston, an internal combustion engine cylinder, a passageway for directing air from the first section outlet to the second section inlet in heat exchange relation to said engine cylinder, and means for supplying air from the second section outlet to the interior of said cylinder.

5. In combination, a rotary displacement device of the alternately accelerating piston type having at least two pairs of pistons and a ring cylinder which each pair of pistons alternately divides into a first and a second section with the remaining pair of pistons separating each section into two working chambers for the compression and expansion of fluids, an inlet and an outlet for each section with the inlet for one section being adjacent the outlet for the other section, said first section outlet and said second section inlet being closed and opened in succession by each piston, a jacketed internal combustion cylinder, and passageways connecting opposite ends of the cylinder jacket to the first section outlet and to the second section inlet.

6. In combination, a rotary displacement device of the alternately accelerating piston type having at least two pairs of pistons and a ring cylinder which each pair of pistons alternately divides into a first and a second section with the remaining pair of pistons separating each section into two working chambers for the compression and expansion of fluids, an inlet and an outlet for each section with the inlet for one section being adjacent the outlet for the other section, said first section outlet and said second section inlet being closed and opened in succession by each piston, a jacketed internal combustion cylinder, passageways connecting opposite ends of the cylinder jacket to the first section outlet and to the second section inlet, and means for supplying air from said second outlet to the interior of said engine cylinder.

7. In combination, a rotary displacement device of the alternately accelerating piston type having at least two pairs of pistons and a ring cylinder which each pair of pistons alternately divides into a first and a second section with the remaining pair of pistons separating each section into two working chambers for the compression and expansion of fluids, an inlet and an outlet for each section with the inlet for one section being adjacent the outlet for the other section, said first section outlet and said second section inlet being closed and opened in succession by each piston, a jacketed internal combustion engine cylinder, passageways connecting the opposite ends of said jacket to the first section outlet and to the second section inlet, a port leading from said jacket into said cylinder, a spring-biased valve normally closing said port, and engine actuated means for opening said valve.

8. In combination, a rotary displacement device of the alternately accelerating piston type having at least two pairs of pistons and a ring cylinder which each pair of pistons alternately divides into a first and a second section with the remaining pair of pistons separating each section into two working chambers for the compression and expansion of fluids, an inlet and an outlet for each section with the inlet for one section being adjacent the outlet for the other section, said first section outlet and said second section inlet being closed and opened in succession by each piston, an internal combustion engine cylinder, and a passageway for directing air from the first section outlet to the second section inlet and being arranged to attemperate the air therein by waste heat from said engine.

9. In combination, a rotary displacement device of the alternately accelerating piston type having at least two pairs of pistons and a ring cylinder which each pair of pistons alternately divides into a first and a second section with the remaining pair of pistons separating each section into two working chambers for the compression and expansion of fluids, an inlet and an outlet for each section with the inlet for one section being adjacent the outlet for the other section, said first section outlet and said second section inlet being closed and opened in succession by each piston, a two-cycle internal combustion engine cylinder, a passageway for directing air from the first section outlet to the second section inlet and being arranged to attemperate the air therein by waste heat from said engine, a valve providing communication between said passageway and engine cylinder, and engine driven means for actuating said valve.

10. In combination, a rotary displacement device of the alternately accelerating piston type having at least two pairs of pistons and a ring cylinder which each pair of pistons alternately divides into a first and a second section with the remaining pair of pistons separating each section into two working chambers for the compression and expansion of fluids, an inlet and an outlet for each section with the inlet for one section being adjacent the outlet for the other section, said first section outlet and said second section inlet being closed and opened in succession by each piston, a two-cycle internal combustion engine cylinder, a passageway for directing air from the first section outlet to the second section inlet and being arranged to attemperate the air therein by waste heat from said engine, a valve providing communication between the second section outlet and said engine cylinder, and engine-operated means for actuating said valve.

11. In the combination according to claim 5, valve means interposed between said cylinder jacket and said second section inlet.

12. In the combination according to claim 6, valve means interposed between said cylinder jacket and said second section inlet.

13. The combination according to claim 1 characterized by said first section outlet and said second section inlet being each fully opened only when the other is fully closed.

14. In combination, a rotary displacement device of the alternately accelerating piston type having at least two pairs of pistons and a ring cylinder which each pair of pistons alternately divides into two sections with the remaining pair of pistons dividing each section into two working chambers between successive pistons for the compression and expansion of fluids, a first piston-controlled inlet port arranged to admit air between two successive pistons during movement thereof apart, a first piston-controlled outlet port arranged to permit escape of air from between said two successive pistons during a portion of their movement together, a second piston-controlled inlet port arranged to admit air between one of said pistons and another piston during a portion of their movement apart, a second piston-controlled outlet port arranged to permit air to escape from between said two last-named pistons during movement thereof together, said first outlet port and said second inlet port being closed and opened in succession by each piston with each port being fully opened only when the remaining port is fully closed, a source of heat and a conduit for conducting air from said first outlet port to said second inlet port in heat exchange relation to said heat source.

15. In combination, a rotary displacement device of the alternately accelerating piston type having at least two pairs of pistons and a ring cylinder, a first piston-controlled inlet port arranged to admit air between two successive pistons during movement thereof apart, a first piston-controlled outlet port arranged to permit escape of air from between said two successive pistons during a portion of their movement together, a second piston-controlled inlet port arranged to admit air between one of said pistons and another piston during a portion of their movement apart, a second piston-controlled outlet port arranged to permit air to escape from between said two last-named pistons during movement thereof together, said first outlet port and said second inlet port being closed and opened in succession by each piston, a conduit connecting said first outlet port to said second inlet port, and a source of heat operatively related to said conduit.

16. The combination according to claim 15 characterized by said first section outlet port and said second section inlet port being each fully opened only when the other port is fully closed.

17. In combination, a rotary displacement device of the alternately accelerating piston type having a first and a second pair of ports arranged respectively on opposite sides of each position of minimum spacing of the pistons, said second pair of ports being closed and opened in succession by each piston, a conduit connecting the two ports of the second pair, and a source of heat operatively related to said conduit.

18. The combination according to claim 17 characterized by each of said second pair of ports being fully opened only when the remaining port is fully closed.

CHARLES BANCROFT.